United States Patent [19]

Birnbach et al.

[11] Patent Number: 4,723,263

[45] Date of Patent: Feb. 2, 1988

[54] X-RAY SOURCE

[75] Inventors: Curtis Birnbach, Bronx; Jay Tanner, Nesconset, both of N.Y.; Richard Heese, Westmont, Canada

[73] Assignee: Quantum Diagnostics, Ltd., Hauppauge, N.Y.

[21] Appl. No.: 860,414

[22] Filed: May 7, 1986

Related U.S. Application Data

[63] Continuation-in-part of Ser. No. 736,136, May 20, 1985, Pat. No. 4,670,894.

[51] Int. Cl.$^4$ .................................................. H01J 35/06
[52] U.S. Cl. ..................................... 378/122; 378/136
[58] Field of Search ................ 378/122, 136, 143; 372/5

[56] References Cited

U.S. PATENT DOCUMENTS

| | | | |
|---|---|---|---|
| 3,567,940 | 3/1971 | Lambert | 378/106 |
| 4,042,827 | 8/1977 | McCorkle et al. | 372/5 |
| 4,229,708 | 10/1980 | Mani et al. | 372/5 |

Primary Examiner—Janice A. Howell
Assistant Examiner—David P. Porte
Attorney, Agent, or Firm—Ostrolenk, Faber, Gerb & Soffen

[57] ABSTRACT

An X-ray source with a cathode formed as a cylindrical electrode having a hollow central anode tube on its axis, with a grid surrounding the anode and interposed between the anode and cathode. The central anode tube is hollow and filled with a working medium. A high negative voltage is applied to the cathode, but the flow of electrons to the anode is blocked by the grid which is held near cathode potential. After a space charge is created at the grid by electrons from the cathode, a very short pulse to ground is applied to one end of the grid, yielding a relativistic wave of potential which propagates along the axial length of the grid. This wave of potential releases the electrons from the cathode, which flow directly to the anode. The impingement of the electrons on the tubular anode produces X-rays from the interior surface of the anode tube. These X-rays, together with the impinging electrons, pump the working medium along the length of the anode, causing a population inversion leading to the release of coherent X-rays in a wave synchronized with the propagating grid potential which exits the structure at the far end of the anode. The X-ray source may consist of identical units coupled together in series to provide a high power X-ray beam, and may be configured in other than cylindrical shapes depending on the output desired.

22 Claims, 15 Drawing Figures

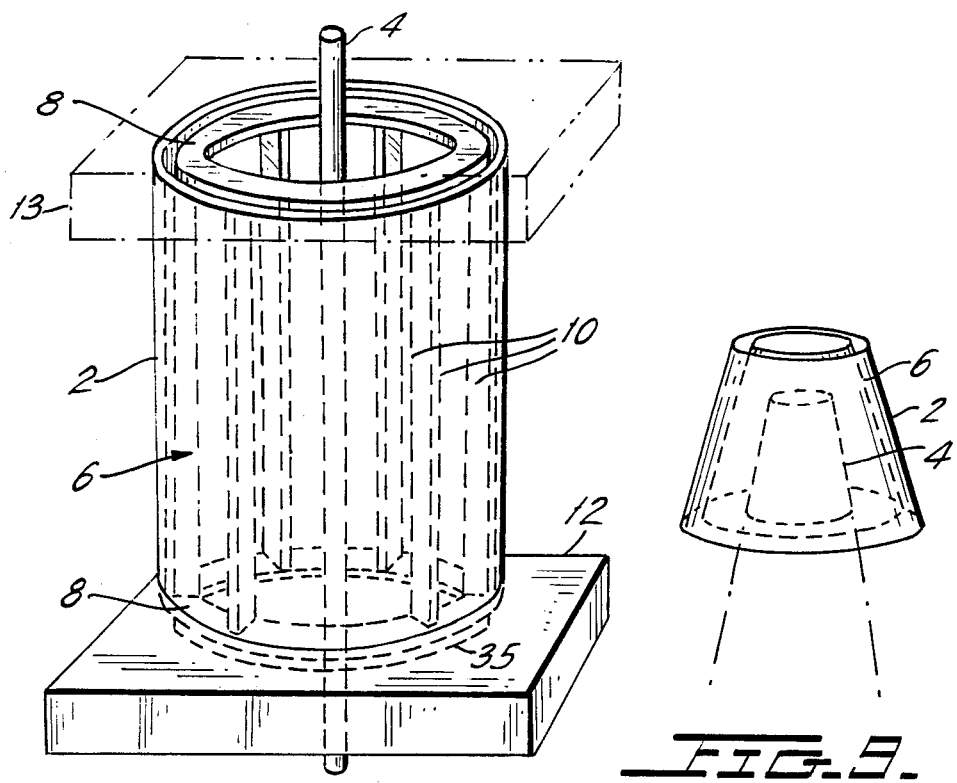
_FIG.1B_
_FIG.9_
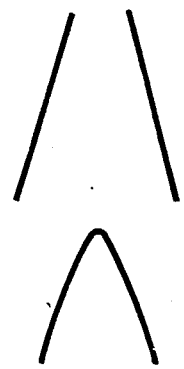
_FIG.10A_
CONE
DIVERGING
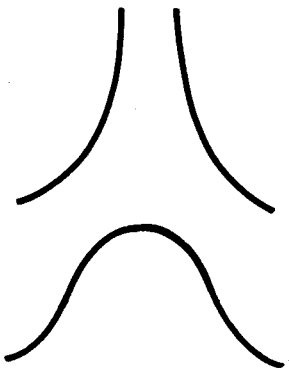
_FIG.10B_
HYPERBOLE
GAUSSIAN
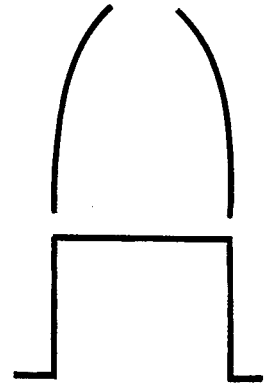
_FIG.10C_
PARABOLA
SQUARE

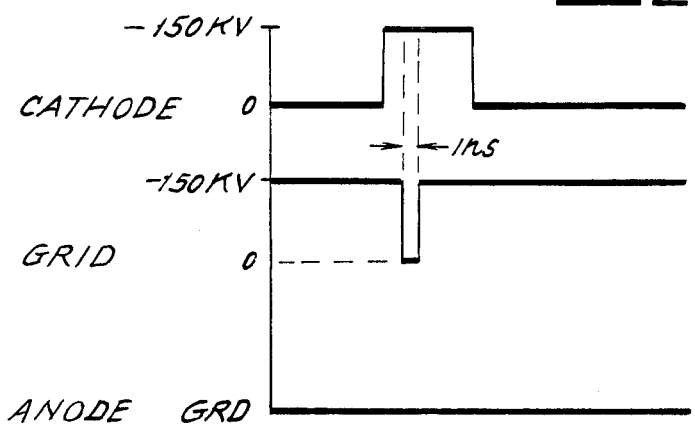
FIG. 3
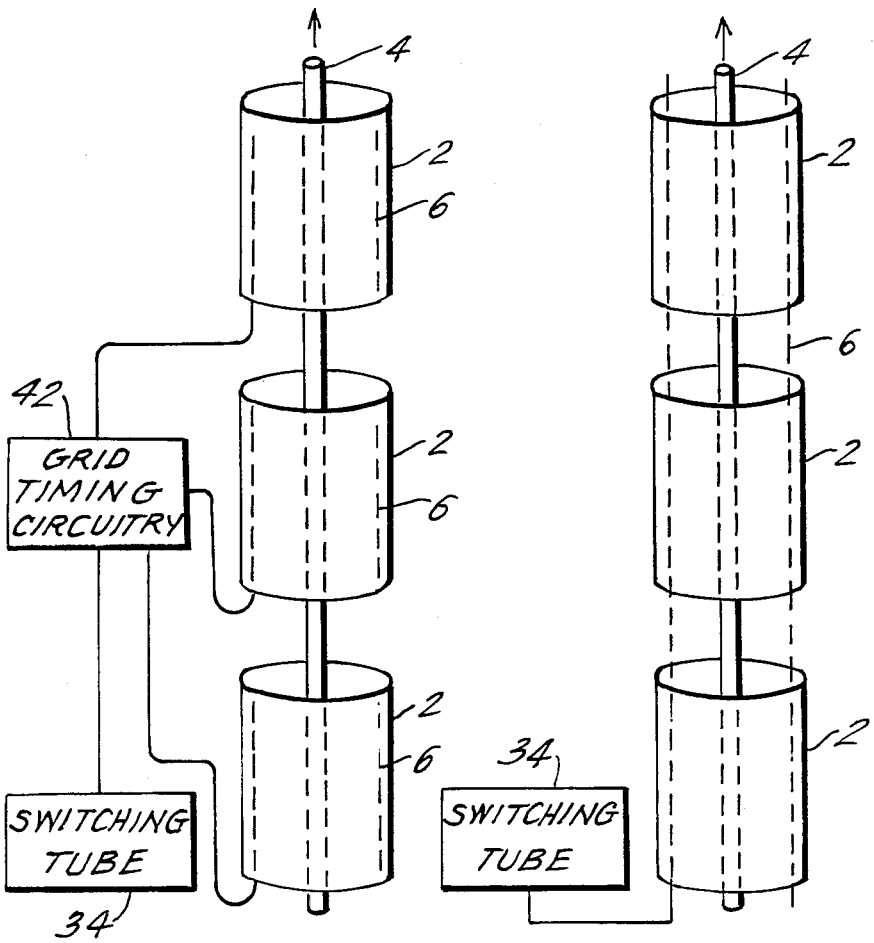
FIG. 4
FIG. 5

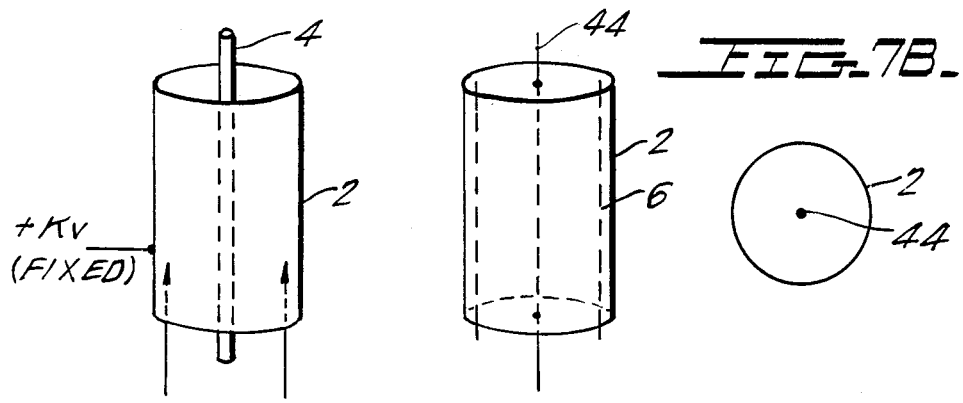
FIG. 8A  FIG. 7A.
FIG. 7B.
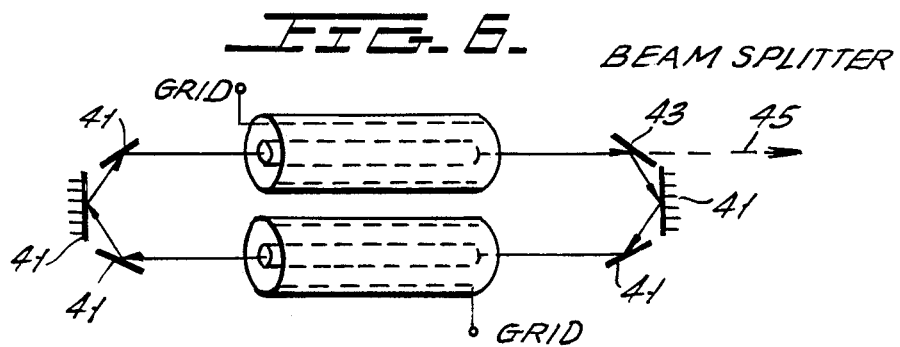
FIG. 6.
BEAM SPLITTER
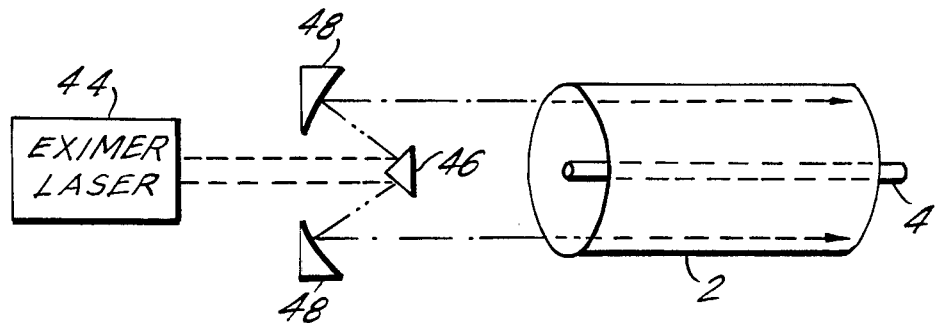
FIG. 8B.

X-RAY SOURCE

This application is a continuation-in-part of copending application, Ser. No. 736,136, filed May 20, 1985, entitled X-RAY SOURCE TUBE EMPLOYING COLD CATHODE GAS DISCHARGE TUBE WITH COLLIMATED BEAM, now U.S. Pat. No. 4,670,894, issued June 2, 1987.

BACKGROUND OF THE INVENTION

This invention relates to a novel X-ray source.

The invention disclosed is related to copending application, Ser. No. 06/736,136 entitled X-RAY SOURCE TUBE EMPLOYING COLD CATHODE GAS DISCHARGE TUBE WITH COLLIMATED BEAM, filed May 20, 1985, now U.S. Pat. No. 4,670,894, issued June 2, 1987, the disclosure of which is herein incorporated by reference. That application discloses a novel X-ray source which employs a cold cathode, rather than a heated filament cathode. The use of a cold cathode in conjunction with a triode structure results in the emission of X-rays having a constant bremstrahlung spectrum, which is necessary to obtain proper grey scale rendition when the tube is used, for example, for medical diagnostic purposes.

A cold cathode can be configured to provide a relatively wide surface area source of energetic electrons. Such a configuration avoids a high density target region on the anode which is associated with prior art filament heated cathodes. As described in the copending application, a control grid is disposed between the cathode and anode of the X-ray source tube. The control grid ensures the firing and operation of the tube at substantially a constant voltage, thus avoiding a change in $KV_{peak}$ for the tube and the consequent shift in bremstrahlung content.

The present invention uses a cathode-grid-anode configuration similar to the X-ray source tube described above, but produces the spontaneous emission of X-rays from a working medium in the anode. When the electrons impinge on the anode, X-rays are created and, in particular, flood the hollow center section of the anode which is filled with a working medium. The X-rays, together with the impinging electrons, acts as the pump to produce a population inversion that causes the spontaneous emission of coherent X-rays (which are different from the pumping X-rays produced in the prior invention).

Thus, the present invention provides a novel X-ray source. When the X-ray source of the present invention is arranged in a series of stages, a highly amplified X-ray beam is obtained.

SUMMARY OF THE INVENTION

The X-ray laser of the present invention is formed of a cylindrical cathode having a hollow central anode tube centered on its axis with a grid surrounding the anode and interposed between the anode and cathode.

The central anode tube is connected at one end to a gas source or furnace which produces a gas vapor and forces the vapor to flow along the axis of the tube. The gas constitutes the working medium in the preferred embodiment, but other materials may be used. A high negative voltage is applied to the cathode, but the flow of electrons from the cathode to the anode is blocked by the interposing grid, which is normally maintained at a potential close to that of the cathode. A very short high negative pulse is applied to one end of the grid, which releases electrons from the cathode. The cylindrical shape of the cathode and grid focuses the released electrons onto the central anode.

Since the grid potential is connected to one axial end of the grid, the high voltage pulse to ground creates a relativistic wave of potential which propagates along the axial length of the grid, releasing electrons from the cathode toward the anode as it travels. The impingement of the electrons on the tubular anode produces X-rays from the interior surface of the tube. The X-ray flux created is the equivalent of the pumping energy of a conventional laser. This X-ray flux, together with the impinging electrons, interacts with the gas ions in the tube to produce a population inversion which yields a very high strength pulse of X-rays which sweep down the length of the anode tube in synchronization with the release of the electrons induced by the propagating grid potential.

In one embodiment of the invention, the gas vapor can flow through one continuous anode to a second stage device having an identical construction to the first stage. The grid of the second stage, however, is fired at the instant when the X-ray radiation output of the first unit reaches the second unit. Thus, the radiation of the second unit is pumped still higher, resulting in amplified X-ray beam. Any number of stages can be ganged together with their respective grids timed to fire when the X-ray wave from the preceding unit arrives.

In a further embodiment of the invention, a single grid is used for a plurality of stages. The propagation of potential along the grid causes the release of electrons from the cathode to the continuous anode in the manner of a relativistic wave propagating from stage to stage along the length of the axis of the respective cathodes. This arrangement eliminates the need for the grid timing circuitry required in the previously described multistage embodiment.

In another embodiment of the invention, the anode tube containing a vaporized element can be replaced by solid wire material. The wire is vaporized by the release of electrons from the cathode. Thus, the material of the wire serves as the atom source of the working medium.

In a further embodiment of the invention, the grid is eliminated from the system and a fixed voltage is connected between the anode and cathode. A photoemitter material lines the internal surface of the cathode. A laser light is arranged to shine on the photoemitter surface to induce electron emission. The propagation of the axially directed laser beam along the photoemitter surface acts like the propagating potential in other embodiments to induce a moving wavefront of X-rays along the anode.

The structure of the device need not necessarily be of cylindrical shape. The shape may be varied according to the desired X-ray output pattern.

BRIEF DESCRIPTION OF THE DRAWINGS

FIGS. 1A and 1B show a side cross-sectional view, and a side perspective view, respectively, of the X-ray source constructed in accordance with the invention.

FIG. 3 is a timing diagram showing the relative potentials of the cathode, grid and anode.

FIG. 4 is a depiction of one embodiment of the present invention in which multiple units are connected in series and grid timing circuitry is used to control the propagation of the X-ray beam.

FIG. 5 is a view of another embodiment of the present invention in which multiple stages are connected together and which features a unitary grid which controls the propagation of the X-ray beam.

FIG. 6 shows an embodiment of the present invention in which the X-ray beam repeatedly passes through two stages for amplification.

FIGS. 7A and 7B show a side view and an end view, respectively, of another embodiment of the present invention in which the anode consists of a solid wire, the material of which serves as the atom source of the working medium.

FIGS. 8A and 8B show another embodiment of the invention which uses a laser beam traveling down the inner surface of the cathode in lieu of the grid.

FIG. 9 shows an embodiment of the present invention in the shape of truncated cones.

FIGS. 10A, 10B and 10C show the output pattern resulting from various shapes of the present invention.

DETAILED DESCRIPTION OF THE PREFERRED EMBODIMENTS

Figure 1A:
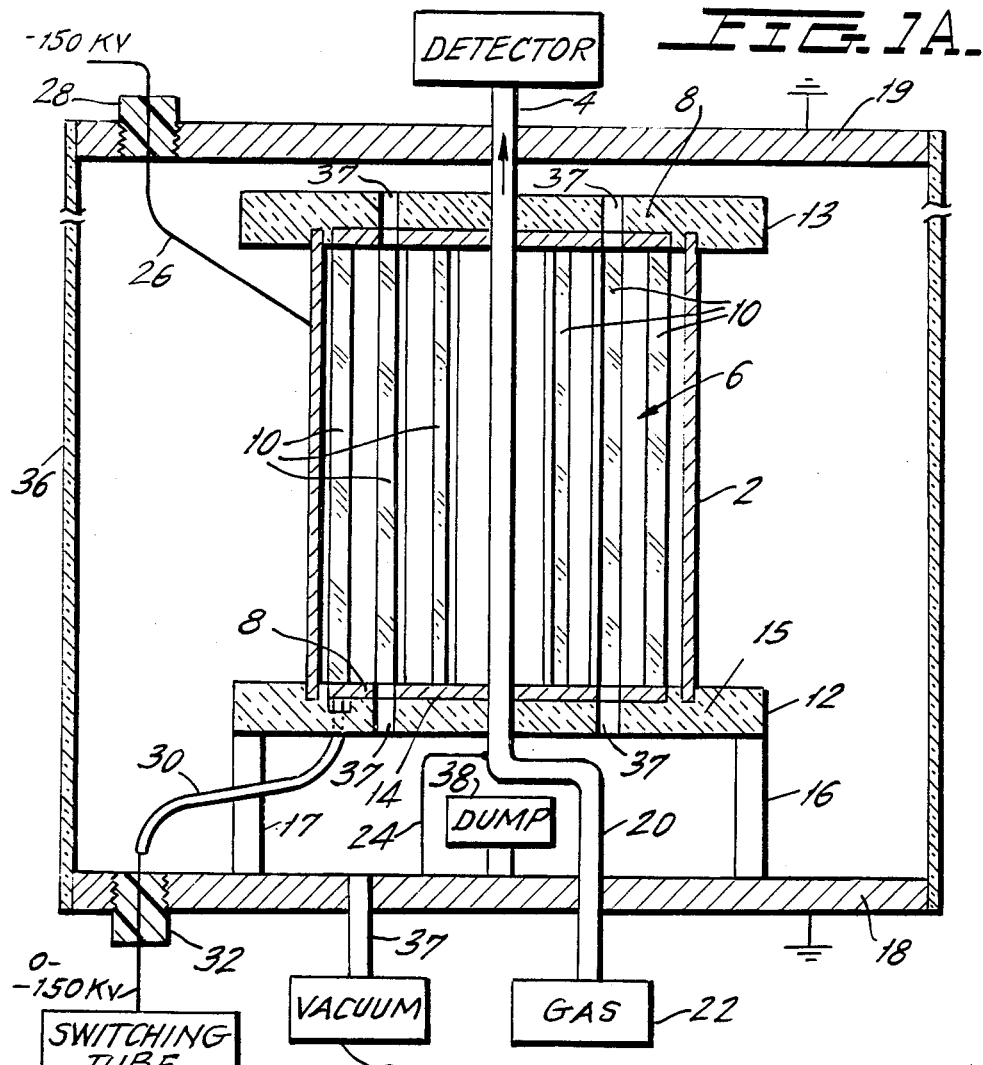
Figure 2:
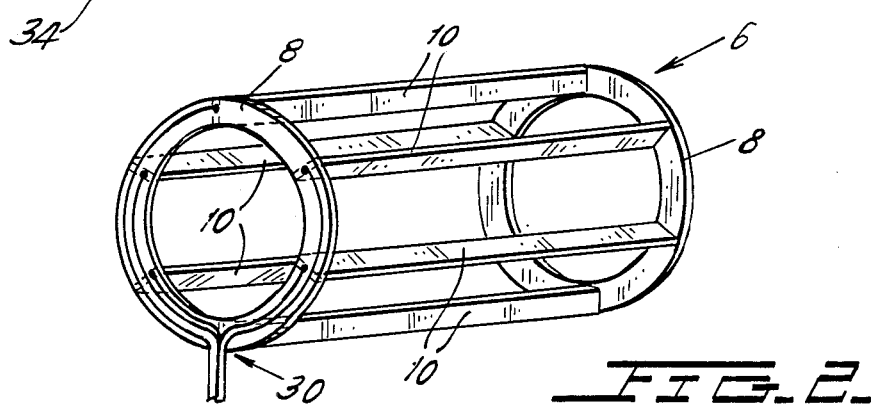
FIG. 2 is a perspective view of the grid utilized in the present invention.

Referring first to FIGS. 1A and 1B, there is shown therein the structure of a single unit of the present invention. The basic structure consists of a cylindrical electrode forming the cathode 2 having a hollow central anode tube 4 disposed on its axis, with a cylindrical grid 6 surrounding the anode tube and interposed between the anode and the cathode. The cathode cylinder 2 has a wall thickness of approximately one centimeter and is formed of a carbon material with a carbon felt lining on its interior surface. The anode 4 consists of a hollow rod one-half inch in diameter having a wall thickness of a few mils, and is preferably formed of a material such as rhenium or molybdenum. Grid 6 may be formed of any common conductive metal but is preferably comprised of electronic grade nickel or nickel chrome alloy. As shown in further detail in FIG. 2, grid 6 consists of end rings 8 and a plurality of slats 10 joining the end rings 8. The slats or fins of the grid are approximately 120 in number, but the number is variable depending on the particular grid configuration desired.

In the preferred embodiment, the diameter of cathode 2 can range from six inches to ten feet. The critical dimension is the ratio of the diameter of cathode to the diameter of anode, this ratio being greater than 10:1. The greater this ratio, the greater will be density of electrons on the anode. It is possible to use other anode/cathode ratios according to geometrical requirements, but the drive requirements will change accordingly.

The grid 6 is positioned quite close to the cathode 2. Typically, the cathode 2 would be positioned approximately 7.25 inches from the anode 4, with the grid 6 positioned almost adjacent to cathode 2.

The length of the assembly is typically, but not limited to, one and a half to two feet. As will be discussed in further detail below, however, the preferred length is dependent upon the length of time that the metastable state lasts in the lasing medium.

Preferably, anode 4 is slightly longer than cathode 2 to enable external support of the anode within the cathode. A pair of ceramic support end plates 12, 13 are provided with cylindrical grooves 14, 15 for receiving the ends of grid 6 and cathode 2. Ceramic support insulator 12 is supported by support tubes 16, 17 which are mounted on base plate 18. Base plate 18 and top plate 19 are kept at ground potential.

A stainless or copper tube 20 is connected to anode 4 for supplying gas to the anode from gas source 22. The working medium can be any of a variety of gases such as neon, aluminum, sodium, selenium or yttrium. Argon, krypton and xenon may also be used and are particularly desirable since they are gases at room temperature and allow for simpler construction of the device as they need not be vaporized. It is also possible to use liquid mercury as the working medium. The liquid mercury could be preheated by an electrical current to vaporize the mercury in order to produce ionizable atoms. Other liquids or solids can be used provided they are approximately transparent to the X-rays which are produced.

Unless a room temperature gas is used, it is necessary to provide a furnace to form vaporized gas and to force the vaporized gas along the axis of the anode 4. The furnace may be of any well-known variety, and may operate at a temperature, for example, of 2,500° C. The pressure of the gas in the anode should be as high as possible consistent with the anode wall thickness and the ability of the wall to resist the pressure.

The anode 4 is electrically coupled to the base plate 18 by wire 24 and is thereby kept at ground potential. Cathode 2 is electrically coupled to a $-150$ KV source by wire 26 passing through insulator 28. The grid is coupled at one end to a switching tube 34 by wire connection 30 passing through insulator 32. As shown in further detail in FIG. 2, conductor 30 actually consists of a plurality of wires which lead through end ring 8 to the ends of the individual slats 10 of grid 6. As shown in FIG. 1B, a recess 35 in ceramic support insulator 12 is provided for the wires. The individual wires comprising conductor 30 are designed to be the same length to within 1/1000 of an inch, such that the change in voltage from switching tube 34 reaches each of the slats at approximately the same instant of time. Switching tube 40 is preferably an Eimac Y847 switching tube which can provide a pulse from $-150$ KV to ground in a length in time of one nanosecond to the grid 6.

The entire assembly is surrounded by a glass envelope 36 and a vacuum in excess of $10^{-6}$ Torr is maintained inside the glass envelope. Apertures 37 are provided in ceramic support insulators 12, 13 and base plate 18 to provide connection for the vacuum pump.

Referring now to FIG. 3, in the operation of the device, the cathode is set to a potential of $-150$ KV. At this point in time, the flow of electrons to the anode 4 is blocked by the presence of the grid 6 at ground potential. However, after a space charge is created at grid 6, a very sharp ground pulse of one nanosecond duration is applied to one end of the grid through wire connection 30. The pulse creates a relativistic wave of potential which propagates along the axial length of the grid, releasing electrons from the cathode toward the anode as it travels. All of the electrons which are released from the cathode reach the anode 4 within about one nanosecond. The impingement of the electrons on the tubular anode 4 produces X-rays from the interior surface of the tube, this X-ray flux being the equivalent of the pumping energy of a conventional laser. This X-ray flux, together with the impinging electrons interacts with the gas ions of the working medium to produce a very high strength pulse of X-rays which sweeps down the length of the anode tube in synchronization with the release of the electrons induced by the propagating grid potential. An electron energy of approximately 125 KeV is easily obtained. The grid geometry should be approximately designed so that the propagation along the length of the grid will occur at the velocity of light.

The X-rays produced are either ultraviolet or soft X-rays having a wavelength of 50 Angstroms to 200 Angstroms and range from 0.5 Kev to 115 Kev, depending on the lasing gas used. For example, if selenium is used as the working medium, a radiation of approximately 180 Angstroms will result. Other working mediums can produce higher energy X-rays. All X-rays produced by this version of the invention occur in a single pass. That is, there is no traditional multiple reflection as in a true laser, but there is simply amplified stimulated radiation created by the passage of a single wavefront along the axis of the tube (i.e. the tube acts as a superradiant source). The length of the tube assembly should be adjusted to be equal to the length of time that the metastable state exists in the atoms selected for the working medium. Thus, if selenium is used, which radiates at 180 Angstroms, the lifetime of the metastable state results in a length of tube of approximately one foot, or one nanosecond of time for the existence of the metastable state. If the anode wall is made thin enough, the electrons that enter into the laser space enhance production of X-rays in that space.

Since the radiation produced within the anode tube 4 flows in both directions along tube 4 (although predominantly forward), it is necessary to provide a suitable X-ray dump 38 at the gas source end of the tube to prevent damage to the gas source or furnace 22. X-ray dump 38 can, for example, consist of cubic boron nitrides backed by lead and capable of withstanding several thousand degrees Centigrade.

In the embodiment shown in FIG. 1, a detector 40 is present at the open end of tube anode 4 to measure the amount of X-ray radiation generated. However, in further embodiments of the invention, shown in FIGS. 4 and 5, the vapor in the anode 4 can flow to a second stage device having an identical construction to the first which, however, is fired at the instant the output X-ray radiation of the first unit reaches the second unit. This results in the radiation of the second unit being pumped still higher.

In the embodiment shown in FIG. 4, a number of stages are ganged together with their respective grids controlled to fire when the preceding wave arrives. Grid timing circuitry 42 is provided for this purpose.

In the embodiment shown in FIG. 5, a continuous grid is used for a plurality of stages. The propagation of potential along the grid causes the release of electrons from the cathode to the continuous anode 4 in the manner of a relativistic wave propagating from stage to stage along the length of the axis of the respective cathodes. This arrangement eliminates the requirement for the grid timing circuitry 42 required in the multi-stage embodiment of FIG. 4.

In the embodiment of the present invention shown in FIG. 6, the X-ray beam repeatedly passes through the same two units by grazing incidence reflection from plane mirrors 41. Mirror 43 is a beam splitter, so as the intensity of the X-ray beam builds up, an output 45 is generated therethrough. The grids of the two (or more) stages are fired alternately to increase the gain (and thus the X-ray beam intensity).

Referring now to FIGS. 7A and 7B, a further embodiment of the invention is shown in which the anode tube 4 containing a vaporized element is replaced by a solid wire 44 of material which is to be vaporized. The material of the wire serves as the atom source of the working medium. The wire is vaporized by the release of electrons from cathode 2 and must be replaced after each shot.

In the embodiment shown in FIGS. 8A and 8B, the grid is eliminated from the system and a fixed voltage is applied to the cathode 2. The cathode 2 has a photoemitter material on its internal surface such as nickel lined with cesium iodide or any other material with a low work function. Laser light from an excimer laser (minimum 200 watts) with an output wavelength of 100–300 nanometers is formed by an optical system into a cylindrical tube of light and is arranged to shine on the photoemitter surface of cathode 2 to induce electron emission. In the example shown in FIG. 8B, the laser light is intercepted by a conical reflector 46 which reflects the cylinder of light out to a parabolic reflector 48, which forms a hollow cylinder of laser light that propagates down the interior of the cathode cylinder. The propagation of the laser light along the photoemitter surface acts like the propagating potential in the previously described embodiments to thereby induce a moving wavefront of X-rays along the anode 4.

Although the present invention has been described with respect to a number of embodiments above, various other modifications are possible. For example, when X-ray mirrors become available that reflect at normal incidence, it will be possible to form a true X-ray laser with traditional multiple internal reflection. Also, as previously mentioned, the cylindrical shape shown in the preferred embodiments is not necessary and various other geometries could operate equally satisfactory.

FIG. 9 shows an example of the present invention in the shape of a truncated cone. Such a configuration produces a diverging X-ray output.

FIGS. 10A, 10B and 10C show the respective outputs generated from the present invention in various shapes. As previously discussed in connection with FIG. 9, a conical shape produces the diverging output shown in FIG. 10A. A hyperbolic shape produces a gaussian output as shown in FIG. 10B. A parabolic shape results in a square wave output as shown in FIG. 10C.

Thus, although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. An X-ray source comprising a large area cold cathode, an elongated anode comprising a working medium, and a grid which acts as a gate interposed between said cathode and said anode, said cathode being cylindrically symmetric to and enclosing said anode and said grid, said cathode at a first potential, said anode at a second potential, and said grid rapidly switchable between potentials substantially the same as said first and second potentials, respectively, a pulse from said first potential to said second potential applied to said grid of up to microsecond order duration releasing electrons from said cathode toward said anode, the impingement of said electrons on said anode producing pumping X-rays from said anode, the voltage $KV_{peak}$ between the anode and cathode remaining substantially constant and the bremsstrahlung spectrum of said pumping X-rays produced from said anode being substantially constant, said pumping X-rays produced from said anode and said electrons pumping the working medium to produce coherent X-rays which travel in a direction parallel to the direction of elongation of said anode.

2. An X-ray source as recited in claim 1, wherein said cathode comprises a cylindrical electrode, and said anode comprises a hollow cylindrical tube filled with a working medium positioned on the axis of said cathode.

3. An X-ray source as recited in claim 2, wherein said grid comprises a cylinder coupled at one end to a switching tube for applying either said first or said second potential to said end of said grid, said grid, when pulsed from said first to said second potential, yielding a relativistic wave of potential which propagates along the axial length of said grid from said one end to the other end, creating a corresponding moving wavefront of electrons impinging on said anode along the length of said anode, the impingement of said electrons on said anode producing pumping X-rays from said anode which, together with said electrons, pump the working medium to produce coherent X-rays which sweep down the length of said anode in synchronization with said moving wavefront of electrons and said relativistic wave of potential.

4. An X-ray source as recited in claim 3, wherein said grid comprises a cylinder of conductive metal formed of a plurality of slats coupled at their respective ends by a pair of rings.

5. An X-ray source as recited in claim 4, wherein said grid is positioned at a relatively short distance from said cathode as compared to the distance from said grid to said anode.

6. An X-ray source as recited in claim 3, wherein the ratio of the diameter of said cathode to the diameter of said anode is at least 10:1.

7. An X-ray source as recited in claim 1, further comprising a switching tube coupled to said grid for providing said pulse of potential to said grid.

8. An X-ray source as recited in claim 3, further comprising a furnace at one end of said anode for providing said lasing gas.

9. An X-ray source as recited in claim 3, wherein said first potential is approximately −150 KV and said second potential is approximately ground potential.

10. An X-ray source as recited in claim 8, further comprising a dump positioned in front of said furnace to prevent said X-rays from damaging said furnace.

11. An X-ray source as recited in claim 3, further comprising a plurality of identical X-ray source units coupled together by a single tubular anode, the respective grids of each of said units being controlled to receive firing pulses at the appropriate time such that the X-rays propagating through said anode are amplified at each unit by the generation of further X-rays.

12. An X-ray source as recited in claim 3, further comprising a plurality of identical X-ray source units coupled together by a single tubular anode and a single grid, said pulse being applied at one end of said grid, the propagation of said pulse down said grid causing a respective wave of X-rays to propagate down said anode through the respective units, such that the X-rays propagating through said anode are amplified at each unit by the generation of further X-rays.

13. An X-ray source as recited in claim 3, comprising at least one X-ray source unit, a plurality of plane mirrors, and a beam splitter arranged to cause amplification of the X-rays by repeated circulation of the X-ray beam through said source unit, said beam splitter forming an output port for said amplified X-rays.

14. An X-ray source as recited in claim 1, wherein said anode comprises a solid wire of material, said wire being vaporized by the impingement of electrons released from said grid to produce X-rays.

15. An X-ray source as recited in claim 1, wherein said cathode, said anode, and said grid are in the shape of a truncated cones.

16. An X-ray source as recited in claim 1, wherein said cathode, said anode, and said grid have a hyperbolic shape.

17. An X-ray source as recited in claim 1, wherein said cathode, said anode, and said grid have a parabolic shape.

18. An X-ray source comprising a large area cold cathode, an anode and a laser source, said cathode held at a first potential, said anode held at a second potential, said cathode comprising a cylindrical electrode with a photoemissive material on its inner surface, said anode positioned on the axis of said cathode, the laser beam from said laser source directed through an optical path to form a hollow cylindrical tube of laser light directed onto said photoemissive material, the shining of said laser beam on said photoemissive material inducing electron emission from said cathode to said anode to produce pumping X-rays from said anode, the voltage $KV_{peak}$ between said anode and said cathode remaining substantially constant and the bremstrahlung spectrum of said pumping X-rays produced from said anode being substantially constant.

19. An X-ray source as recited in claim 18, wherein said anode comprises a hollow cylindrical tube and is filled with a working medium.

20. An X-ray source as recited in claim 19, wherein the propagation of said laser beam along said photoemissive material creates a corresponding moving wavefront of electrons along the length of said anode, said electrons producing pumping X-rays which, together with said electrons, pump the working medium to produce coherent X-rays within said anode, said coherent X-rays produced sweeping down the length of said anode in synchronization with said moving wavefront of electrons and said propagation of said laser beam.

21. An X-ray source as recited in claim 20, wherein said first potential is approximately −150 KV and said second potential is approximately ground potential.

22. An X-ray source as recited in claim 21, wherein said optical path comprises a conical reflector and a parabolic reflector.

* * * * *